United States Patent
Dybdal

(10) Patent No.: US 10,838,071 B1
(45) Date of Patent: Nov. 17, 2020

(54) REDUCING USER MULTIPATH ERROR AND ACQUISITION TIME IN SATELLITE NAVIGATION RECEIVERS

(71) Applicant: The Aerospace Corporation, El Segundo, CA (US)

(72) Inventor: Robert B. Dybdal, Palos Verdes Estates, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 16/712,000

(22) Filed: Dec. 12, 2019

(51) Int. Cl.
*G01S 19/22* (2010.01)
*G01S 19/30* (2010.01)
*G01S 19/29* (2010.01)

(52) U.S. Cl.
CPC .............. *G01S 19/22* (2013.01); *G01S 19/29* (2013.01); *G01S 19/30* (2013.01)

(58) Field of Classification Search
CPC ......... G01C 21/28; G01S 19/09; G01S 19/22; G01S 19/29; G01S 19/30; H04L 27/30
See application file for complete search history.

(56) References Cited

U.S. PATENT DOCUMENTS

| | | | |
|---|---|---|---|
| 5,081,462 A * | 1/1992 | Tachita | G01S 19/30 342/352 |
| 5,440,308 A | 8/1995 | Dybdal et al. | |
| 5,739,788 A | 4/1998 | Dybdal et al. | |
| 5,781,845 A | 7/1998 | Dybdal et al. | |
| 5,952,962 A | 9/1999 | Dybdal | |
| 6,055,431 A | 4/2000 | Dybdal | |
| 6,421,008 B1 | 7/2002 | Dybdal et al. | |
| 6,731,240 B2 | 5/2004 | Dybdal et al. | |
| 6,816,026 B2 | 11/2004 | Dybdal | |
| 6,937,186 B1 | 8/2005 | Dybdal et al. | |
| 6,965,343 B1 | 11/2005 | Dybdal et al. | |
| 7,239,275 B2 | 7/2007 | Dybdal et al. | |
| 7,373,105 B2 | 5/2008 | Dybdal et al. | |

(Continued)

OTHER PUBLICATIONS

E. D. Kaplan and C. J. Hegarty (eds), "Understanding GPS Principles and Applications," second edition Artech (2006); pp. 1-6, 153-241, 279-295.

(Continued)

*Primary Examiner* — Dao L Phan
(74) *Attorney, Agent, or Firm* — Knobbe Martens Olson & Bear

(57) ABSTRACT

Satellite navigation receivers are provided herein. In certain embodiments, a satellite navigation receiver correlates a received RF navigational signal from a satellite with a replica code generated by the receiver. Additionally, errors due to multipath are mitigated by identifying the location of the peak values of the correlation function obtained when the replica code is aligned with the received RF navigational signal. Thus, the peak correlation value is detected by sweeping the user replica code in delay in place of a closed loop early/late discriminator. Moreover, multiple copies of the receiver generated replica codes with different time offsets can be used to perform the acquisition in parallel. This advantageously reduces the amount of acquisition time to align the replica code and provides averaging to improve the accuracy in detecting the delay location of the peak correlation value.

19 Claims, 8 Drawing Sheets

(56) References Cited

U.S. PATENT DOCUMENTS

| | | |
|---|---|---|
| 7,463,191 B2 | 12/2008 | Dybdal et al. |
| 7,518,551 B2 | 4/2009 | Dybdal et al. |
| 7,551,134 B2 | 6/2009 | Dybdal et al. |
| 7,602,336 B2 | 10/2009 | Dybdal et al. |
| 7,800,537 B2 | 9/2010 | Dybdal et al. |
| 7,965,228 B2 | 6/2011 | Dybdal et al. |
| 8,199,851 B1 | 6/2012 | Dybdal et al. |
| 8,259,857 B2 | 9/2012 | Dybdal et al. |
| 8,462,879 B2 | 6/2013 | Dybdal et al. |
| 8,614,644 B2 | 12/2013 | Dybdal et al. |
| 8,614,940 B1 | 12/2013 | Dybdal et al. |
| 8,711,675 B1 | 4/2014 | Dybdal et al. |
| 8,804,808 B1 | 8/2014 | Dybdal et al. |
| 9,065,521 B1 | 6/2015 | Dybdal et al. |
| 9,628,122 B1 | 4/2017 | Dybdal et al. |
| 9,806,747 B1 | 10/2017 | Dybdal et al. |
| 10,056,675 B1 | 8/2018 | Dybdal |
| 2002/0105458 A1* | 8/2002 | Dooley ............ G01S 19/235 342/357.62 |
| 2004/0071196 A1* | 4/2004 | Marsden ............ G01S 19/30 375/147 |
| 2009/0033575 A1 | 2/2009 | Dybdal et al. |

OTHER PUBLICATIONS

R. B. Dybdal, "GPS Satellite Pseudorange Deviation Contributions," Aerospace Tech Rept TOR-2014-02719, Sep. 15, 2014.

C. Macabiau, B. Roturier, E. Chatre, and R. Yazid, "N-Multipath Performance of GPS Receivers," Proc of IEEE Position, Location, and Navigation Symposium, San Diego CA, pp. 41-48, Mar. 13-16, 2000.

R. B. Dybdal and R. H. Ott, "Coherent RF Error Statistics," IEEE Trans Microwave Theory and Techniques MTT-34, pp. 1413-1420, Dec. 1986.

M. S. Braasch, "Autocorrelation Sidelobe Considerations in the Characterization of Multipath Errors," IEEE Trans Aerospace and Electronic Systems 33, pp. 290-295, Jan. 1997.

S. K. Kalyanaraman, M. S. Braasch, and J. M. Kelly, "Code Tracking Architecture Influence on GPS Carrier Multipath," IEEE Trans Aerospace and Electronic Systems 42, pp. 548-560, Apr. 2006.

R. D. J. van Nee, J. Siereveld, P. C. Fenton, and B. R. Townsend, "The Multipath Estimating Delay Lock Loop: Approaching Theoretical Accuracy Limits," IEEE 2nd International Symposium on Spread Spectrum Techniques and Applications, pp. 246-251, Yokohama Japan.

\* cited by examiner

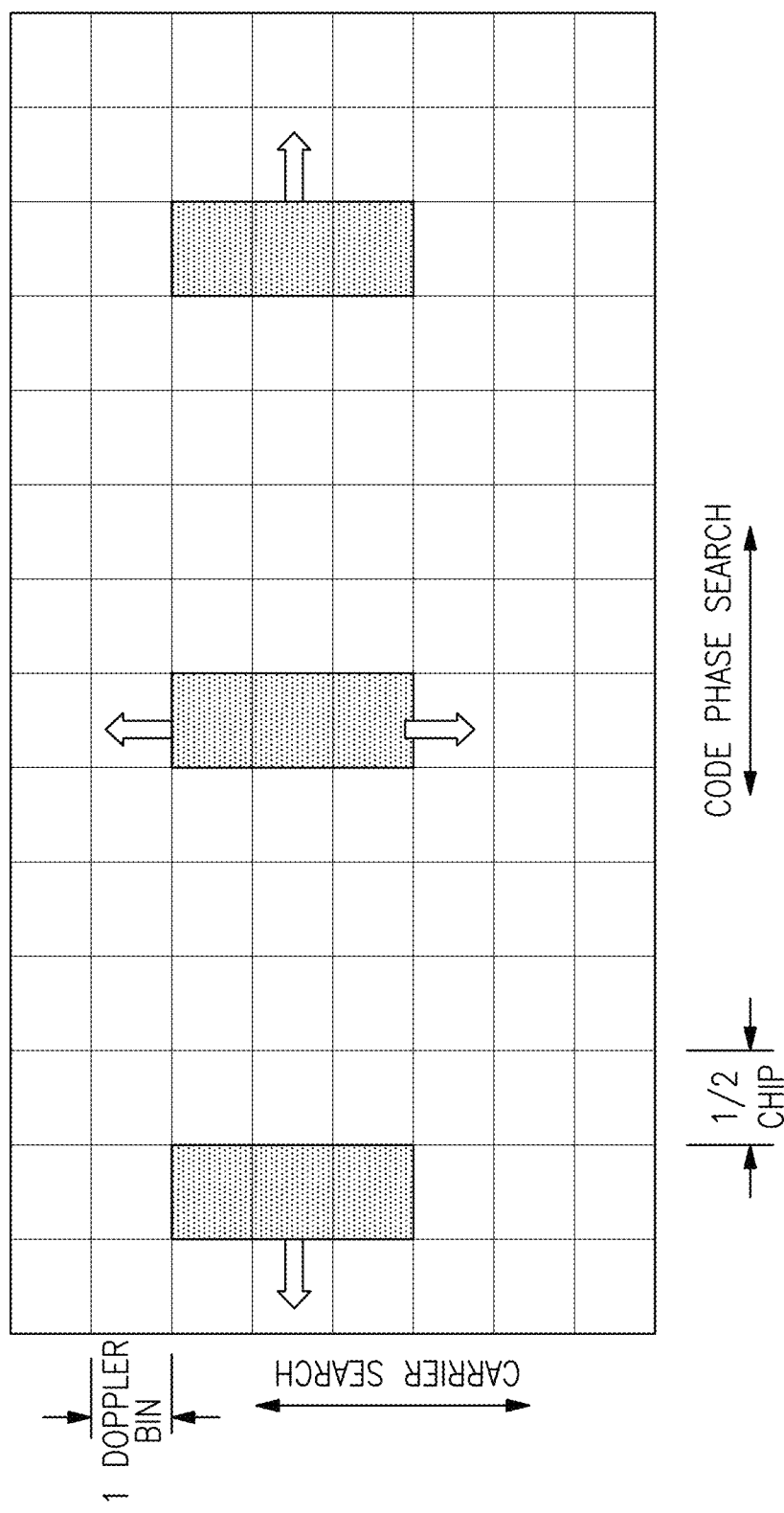

REDUCING USER MULTIPATH ERROR AND ACQUISITION TIME IN SATELLITE NAVIGATION RECEIVERS

FIELD OF THE DISCLOSURE

Embodiments of the invention relate to electronic systems, and more particularly, to satellite navigation receivers.

BACKGROUND

Satellite navigation receivers are capable of determining time of day, location, speed, and/or directional information based on processing radio frequency (RF) navigational signals received from satellites. Satellite navigation receivers are used in a wide variety of applications including consumer electronics, military equipment, and/or commercial products.

Certain satellite navigation receivers can process geolocation and timing information transmitted from a group of satellites. Depending on the type of information calculated by the satellite navigation receiver, typically received signals are required from at least four satellites in order to perform the configured calculations. For example, electronic navigation systems typically require information from three different satellites to determine position and a fourth satellite to determine time offset.

Satellite navigation receivers may have limited functionality and/or exhibit errors in certain operating scenarios or environments. For example, even when a satellite navigation receiver is in line of sight communication with a satellite, the satellite navigation receiver may receive not only the direct line of sight RF navigational signal but also multiple, time delayed copies of the same signal arising from reflections and/or scattering by terrain or manmade objects. Such time delayed copies have relative amplitude and phase values compared to the direct signal. Such signal propagation phenomenon is generally referred to as multipath.

Multipath can give rise to a significant source of errors for satellite navigation receivers, particularly in urban environments. Differential signal processing in particular is dominated by multipath errors since such processing compensates for ionospheric, tropospheric, and time of day components. In one example, precision surveying equipment utilizing differential processing or other systems that differentially process navigational signals are often vulnerable to multipath errors.

To facilitate navigational functionality, satellite navigation receivers correlate navigational codes transmitted by a satellite with replica codes generated locally by the satellite navigation receiver. RF navigational signals from specific satellites are distinguished by a unique navigational code assigned to each satellite and by a unique Doppler offset carrier frequency. Signal acquisition at the satellite navigation receiver involves a lengthy two-dimensional search of the carrier Doppler offset and the code phase delay between the received navigational code from the satellite and the replica code generated by the receiver.

Conventional satellite navigation receivers use an early/late discriminator operating closed loop (for instance, as part of a delay lock loop or DLL) to determine the code phase time delay. By determining the code phase time delay relative to the received code from the satellite, the satellite navigation receiver can determine the transmission time delay from the satellite. The satellite position is described by the ephemeris data contained in the navigation message broadcast by the satellite that also includes satellite clock time offsets. The satellite position and the time delay from the measured code phase determines the range between the specific satellite and the satellite navigation receiver.

A low chip rate code transmitted by the satellite for acquisition purposes includes a sequence of 1023 chips that is repetitively transmitted. Higher chip rate codes are also transmitted repetitively by the same carrier in quadrature with the low chip rate code. The number of high rate chips is an integer multiple of the low rate chips and the integer number of high rate chips are in time alignment with a low data rate chip. As a result, the low chip rate code phase acquisition establishes the Doppler carrier and code phase alignment for both low and high chip rate codes, and the time alignment of the integer number of high data rate chips aids in the code phase alignment of the high chip rate codes.

In the absence of multipath effects, the correlation output of an early/late discriminator used to correlate the received navigational code and the user generated replica code is symmetric about its peak value. However, multipath components distort the correlation symmetry and produce bias errors in the time delay values. Since the number of multipath sources and their amplitude and phase relative to the direct signal are unknown, satellite navigation receivers using early/late discriminators suffer from an unknown bias error.

Moreover, such satellite navigation receivers require long time periods to acquire the four satellite signals for recovering navigational data. For example, the acquisition process is two-dimensional and requires determining the Doppler offset of each satellite's carrier frequency and aligning the user-generated replica code's phase with the received navigational code.

SUMMARY

The inventor of the present application has recognized that multipath is specific to a user's location and satellite locations, that multipath distorts the correlation function in unpredictable ways, and that multipath does not substantially change the peak value locations of correlation functions. Additionally, the desire to reduce acquisition time is also recognized.

Embodiments of the present subject matter are directed towards systems and methods of determining time of day, location, speed, and/or directional information of a vehicle (e.g., an automobile, a ship, an aircraft, a spacecraft etc.) or a person based on RF navigational signals received from a group of satellites even when multipath distortion is present. In contrast, multipath distortion of the correlation function results in an unknown bias error of conventional early/late discriminators.

The inventor has recognized that multipath has substantially no impact on the delay corresponding to the peak value of the correlation function. Thus, in accordance with some embodiments, the location of the peak correlation value is detected by scanning the user replica code in delay in place of the closed loop early/late discriminator to mitigate multipath error. Moreover, multiple copies of the receiver generated replica codes can be used to perform the acquisition in a parallel search (rather than a serial search using a single correlator) to thereby improve both the accuracy of the correlation peak delay value and to reduce the acquisition time.

A satellite navigation receiver is operable to receive an RF navigational signal from a particular satellite and to correlate the received RF navigational signal with a specific replica code generated by the receiver. In some embodiments herein, a satellite navigation receiver mitigates errors due to multipath based on identifying the location in delay of the peak value of the correlation function obtained when the specific replica code is aligned with the received RF navigational signal. Since the delay corresponding to the peak correlation value is substantially unaffected by multipath, the satellite navigation receiver can acquire the navigational code with accuracy even when multipath distortion is present.

Various embodiments of satellite navigation receivers described herein include code tracking circuitry that is operable to correlate different time offset copies of the specific replica code with the received navigational code to obtain correlation peak delay values. For example, the code tracking circuitry can include two or more correlators that each correlate the received navigational code from a specific satellite with a different time offset copy of the user generated replica code for the same satellite, and two or more peak detectors that each detect a peak value of the correlation function of a corresponding correlator. Thus, the correlators are arranged such that the correlations between the received navigational code and different time offset copies of the replica code is done in parallel. This advantageously reduces the amount of acquisition time to align the replica code and provides averaging to more accurately detect the delay location of the peak correlation value.

The systems, methods and devices of this disclosure each have several innovative aspects, no single one of which is solely responsible for the desirable attributes disclosed herein.

BRIEF DESCRIPTION OF THE DRAWINGS

FIG. 5B is a graph of one example of a two-dimensional carrier and code phase search.

Like reference numbers and designations in the various drawings indicate like elements.

DETAILED DESCRIPTION

Satellite navigation receivers, such as Global Navigation Satellite System (GNSS) receivers, derive navigational information by correlating navigational codes from satellites with replica codes produced by the receiver. For example, the satellite navigation receiver can utilize a two-dimensional carrier Doppler offset/code phase search to initially acquire signals from individual satellites.

When multipath components are not present, accurate measurement of the code delay from the satellite can readily be achieved. However, user navigational accuracy is limited by uncertainties produced by multipath propagation. In particular, when multipath components are present, the correlation function is distorted and navigational accuracy is degraded.

For example, one expression of a user's received signal corrupted by multipath is expressed by the equation below. Since the received code is separated into quadrature components and the direct and real part of delayed multipath components are correlated with the user's ideal replica code, the presence of multipath gives rise to distortion. Such multipath distortion is explained in further detail below with reference to FIGS. 1A-1C.

$$C_m = C_d(t) + \sum a_i e^{j\theta_i} C_d(t-\tau)$$
$$= C_d(t) + \sum a_i \cos\theta_i C_d(t-\tau) + j\sum a_i \sin\theta_i C_d(t-\tau)$$

Figure 1A:
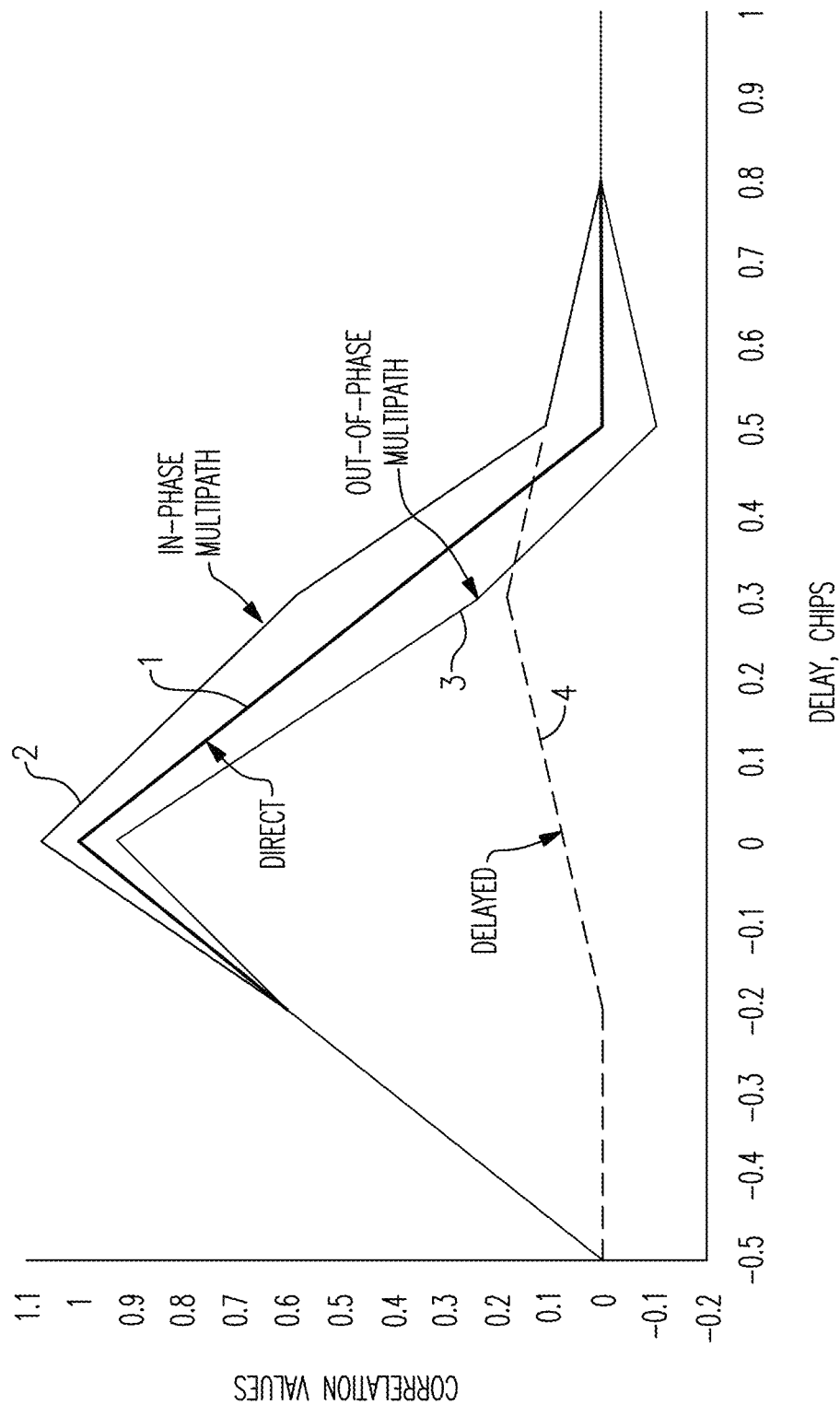
FIG. 1A is a graph of one example of correlation values versus chip delay.

FIG. 1A is a graph of one example of correlation values versus chip delay. The graph depicts various example of pseudorange correlation functions after alignment with the user's replica code.

The graph depicts correlation values of a direct signal 1 without multipath and a delayed multipath signal 4 about 15 dB lower than the direct signal 1 and delayed by about 0.3 chips. The graph also depicts correlation values of the direct and in-phase delayed signals 2 and the direct and out-of-phase delayed signals 3. As shown in FIG. 1, the in-phase delayed component adds to the direct signal, while the out-of-phase delayed component subtracts from the direct signal.

Correlation function distortions have two important features. Firstly, delayed code components are typically smaller than the direct component. However, when the line of sight path is physically obstructed, the received signal consists solely of multipath components having low signal level, thereby causing the user receiver to seek another satellite. When delayed component levels are lower than the direct component level, the delay of the peak correlation value is unchanged by the presence of multipath. Thus, multipath has substantially no impact on the delay of peak values of distorted correlation codes.

Secondly, the correlation function with a delayed code component is no longer symmetric about its peak value. Such a lack symmetry is the root cause of pseudorange deviations.

Figure 1B:
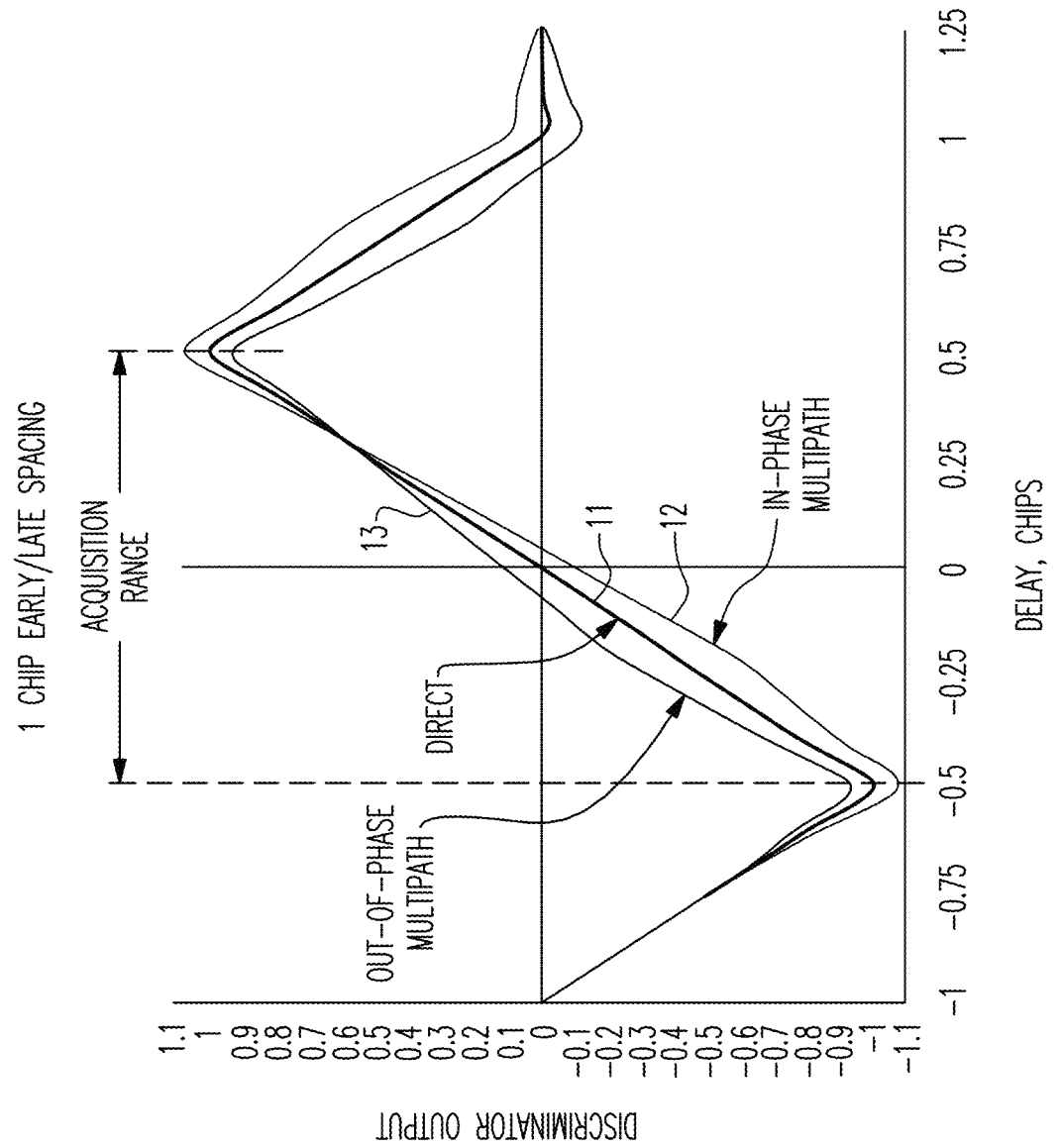
FIG. 1B is a graph of one example of discriminator output versus chip delay for a 1 chip spaced early/late discriminator.

FIG. 1B is a graph of one example of discriminator output versus chip delay for a 1 chip spaced early/late discriminator. The graph depicts discriminator output for various correlation functions for an example −15 dB lower multipath component with a 0.3 chip delay. The graph depicts discriminator output versus chip delay for the direct signal 11, the direct and in-phase delayed signals 12, and the direct and out-of-phase delayed signals 13.

As shown in FIG. 1B, the direct signal 1 without multipath properly goes through 0, and thus the discriminator accurately aligns the received code phase with the user's replica code. Although multipath components produce identical non-zero discriminator values when aligned with the carrier, the multipath components also produce different pseudorange values with respect to the discriminator's zero value. For instance, for the example −15 dB multipath component, the pseudorange is displaced positively by about 0.04 chips for in-phase multipath and about 0.06 chips negatively for out-of-phase multipath.

A discriminator's acquisition range is limited to the linear portion of the discriminator's output around the zero value. In the example of FIG. 1B, the discriminator's acquisition range is somewhat less than one chip. For the low chip rate code component of an RF navigation signal, 1 chip has a 977.5 nanosecond (ns) delay or roughly 960 feet (ft) in range.

Figure 1C:
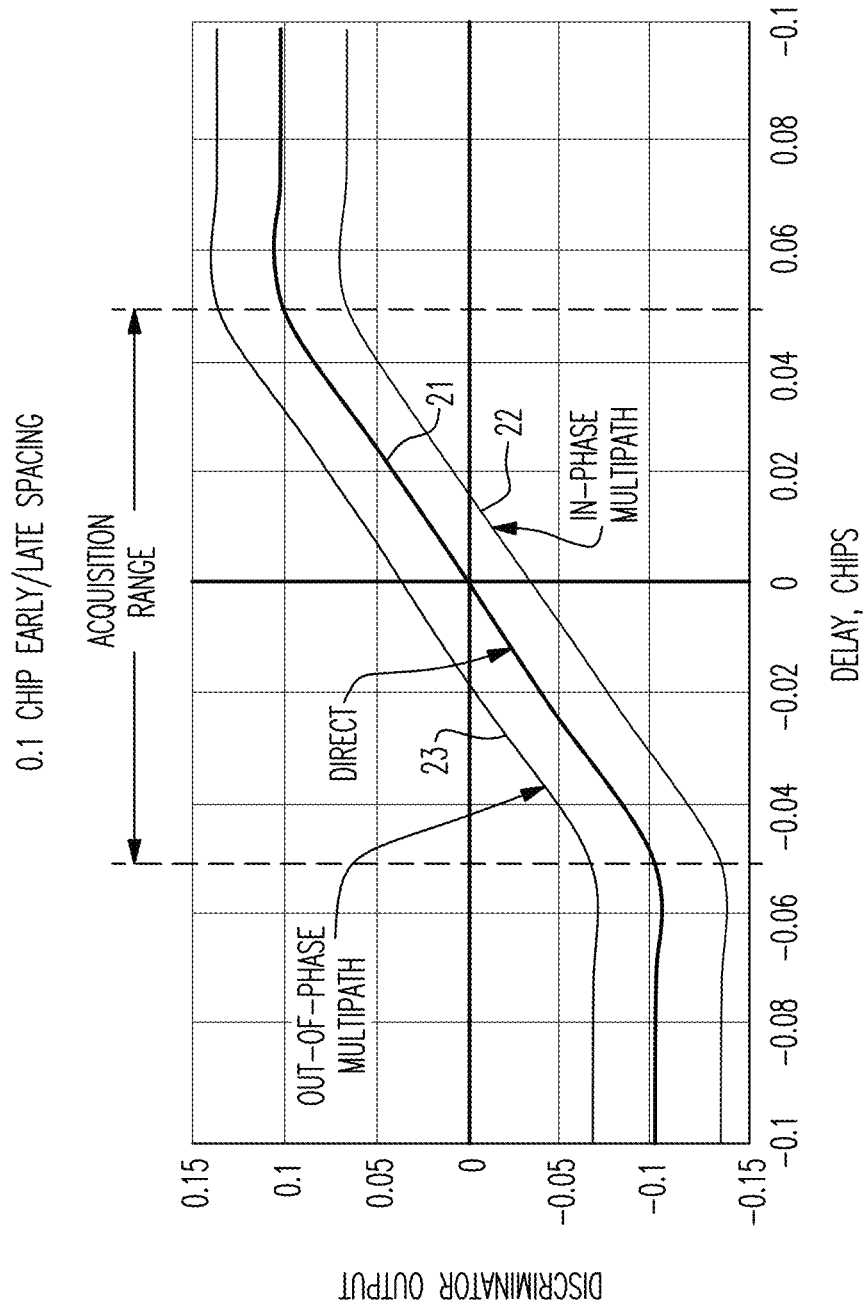
FIG. 1C is a graph of another example of discriminator output versus chip delay for a 0.1 chip spaced early/late discriminator.

FIG. 1C is a graph of another example of discriminator output versus chip delay for a 0.1 chip spaced early/late discriminator. Similar to the graph of FIG. 1B, the graph of FIG. 1C depicts the discriminator output for various correlation functions for an example −15 dB lower multipath component with a 0.3 chip delay. The graph depicts discriminator output versus chip delay for the direct signal 21, the direct and in-phase delayed signals 22, and the direct and out-of-phase delayed signals 23.

In the example of FIG. 1C, the discriminator's acquisition range is somewhat smaller than 0.1 chip. For the low chip rate code component of an RF navigational signal, 0.1 chip has a 97.75 ns delay or roughly 96 ft in range.

With reference to FIGS. 1B and 1C, by reducing the chip spacing from 1 chip to 0.1 chip the multipath-induced pseudorange accuracy is improved. For example, the zero discriminator crossings after carrier frequency alignment in FIG. 1C are about 0.02 chips, compared to the 0.04 and 0.06 chip values for the 1 chip early/late discriminator of FIG. 1B.

Thus, reducing the chip spacing reduces multipath-induced errors in the discriminator. However, reducing the chip spacing also reduces the acquisition range, which in turn increases the acquisition time. Accordingly, early/late discriminators suffer from a tradeoff between acquisition time and multipath-induced pseudorange accuracy.

In FIGS. 1A-1C, examples of degradation from a single multi-path component are depicted. However, degradation in navigational accuracy can be further exacerbated when several multipath components are present. For example, a range of multipath components arise in practical applications, and the resulting correlation function distortion is the sum of the individual distorting multipath components, which can be both site and satellite specific because received multipath levels vary with the terrain features in the direction of the satellite.

In addition to correlation function distortion, multipath components are coherent with the direct component and likewise perturb the carrier phase values. Such carrier phase perturbation increases with the multipath level, and can lead to a shift in the real and imaginary values of the multipath components.

Figure 2A:
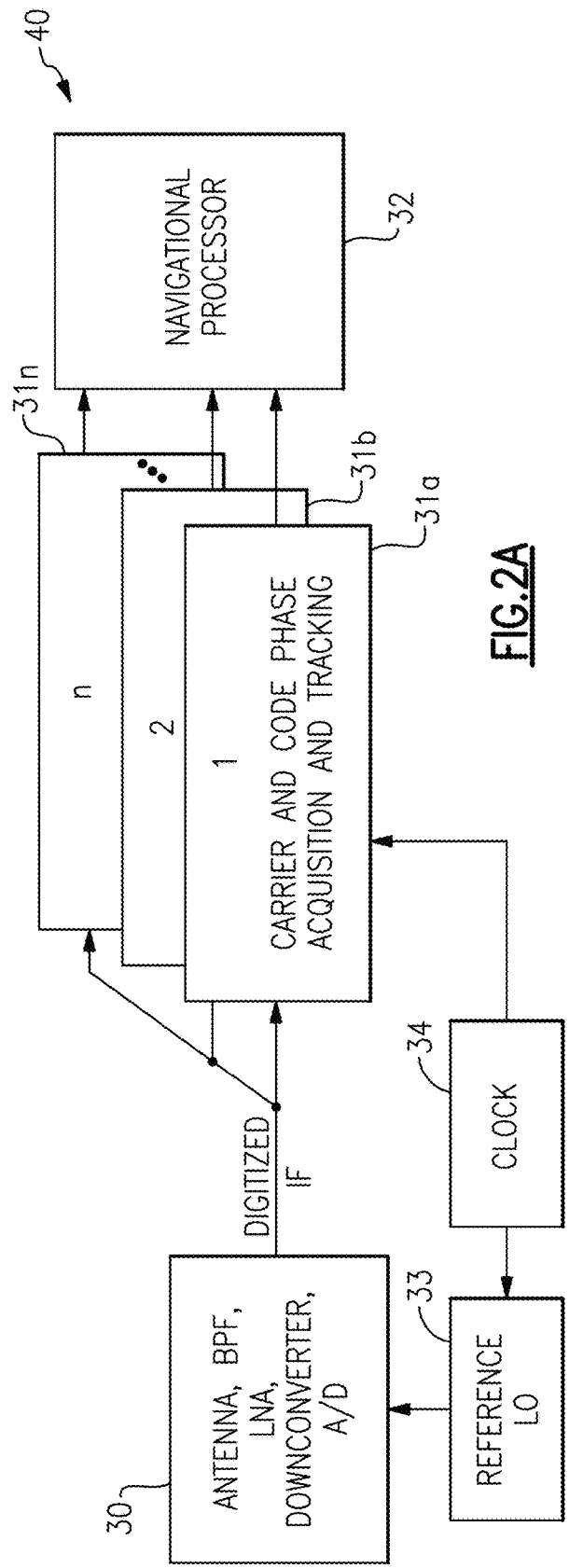
FIG. 2A is schematic diagram of a satellite navigation receiver according to one embodiment.

FIG. 2A is schematic diagram of a satellite navigation receiver 40 according to one embodiment. The satellite navigation receiver 40 includes front end components 30, carrier and code phase acquisition and tracking channels 31a, 31b, . . . 31n, a navigational processor 32, a reference local oscillator (LO) 33, and a user clock 34.

The satellite navigation receiver 40 is used to process RF navigational signals received from satellites to determine time of day, location, speed, and/or directional information. Each satellite is assigned a specific code (for instance, a pseudo-random noise code), and modulates its specific code onto a carrier wave of a particular frequency. In a GNSS application, such as Global Positioning System (GPS), each satellite transmits a low rate code corresponding to a sequence of 1023 chips that is repeated. Additionally, each satellite transmits a higher chip rate code on the same carrier and in quadrature with the low chip rate code. The high rate chips are an integer multiple of the low rate chips and are in time alignment with the low rate chips. Thus, acquisition of the low chip rate code also establishes the Doppler carrier offset and code phase delay for the high chip rate code.

The front end components 30 are used to receive and condition such RF navigational signals, and to provide digital data (digitized IF data, in this example) representing the received RF navigational signals to the carrier and code phase acquisition and tracking channels 31a, 31b, . . . 31n.

With continuing reference to FIG. 2A, the front end components 30 can be implemented in a wide variety of ways. In one example, the front end components 30 include an antenna for receiving an RF navigational signal, a band-pass filter for filtering the received RF navigational signal to a desired bandwidth, a low noise amplifier (LNA) for amplifying the filtered RF navigational signal with a desired gain, a downconverter for downconverting the amplified RF navigational signal to intermediate frequency (IF), and an analog-to-digital converter (ADC) for digitizing the downconverted signal.

Although one example implementation of the front end components 30 has been described, the teachings herein are applicable to front end circuitry implemented in a wide variety of ways. Accordingly, other implementations are possible.

As shown in FIG. 2A, the reference LO 33 controls timing for providing initial downconversion to separate and select the desired carrier frequency band, for instance, frequency bands L1, L2, and L5 for GPS. Following the initial downconversion, additional downconversions to reduced IF frequency typically follow. For example, additional downconversions are generally used to avoid stability issues since high gain is desired prior to A/D conversions to allow increased filter selectivity and to reduce out-of-band interfering signals. Frequency synthesizers following digital synthesis techniques typically provide the frequency conversions and are referenced to the user clock 34.

The carrier and code phase acquisition and tracking channels 31a, 31b, . . . 31n serve to derive the time delays from satellites as well as clock corrections. In certain implementations, the carrier and code phase acquisition and tracking channels 31a, 31b, . . . 31n include four or more channels for determining time delays from three different satellites and the clock time alignment from a fourth satellite. As shown in FIG. 2A, the user clock 34 also provides a timing reference to the carrier and code phase acquisition and tracking channels 31a, 31b, . . . 31n. Illustratively, the offset of the user clock 34 from the system clock can be established and obtained from measurement of the fourth satellite.

In certain implementations herein, multiple carrier and code phase acquisition and tracking channels are used to process the RF navigational signal from a particular satellite to increase acquisition range. For example, multiple correlators with digitally delayed user's replica codes can be used to widen acquisition range and shorten acquisition time. Thus, multiple carrier and code phase tracking channels can simultaneously process an RF navigational signal to reduce acquisition time at the expense of implementation complexity.

As discussed above, each satellite is assigned a specific navigational code, which is known to the satellite navigation receiver 40, for instance, stored in memory of the channels 31a, 31b, . . . 31n and/or the navigational processor 32.

Additionally, the satellite navigation receiver 40 can have knowledge of general satellite positions, for instance, based on satellite locations transmitted as an almanac in the navigation message or in memory when the receiver 40 has been previously used in the same or similar location.

When a particular satellite is in view of the receiver 40, the carrier and code phase acquisition and tracking channels 31a, 31b, . . . 31n generate a local replica of the navigational code assigned to the satellite and correlate the local replica code with the navigational code. The correlation has a peak value when the local replica code and the navigational code are aligned.

In certain implementations, the carrier and code phase acquisition and tracking channels 31a, 31b, . . . 31n perform a two-dimensional process to align carrier frequency and code phase. For example, when acquiring an RF navigational signal, the carrier and code phase acquisition and tracking channel(s) used to acquire that RF navigational signal can generate different local replica codes corresponding to different code delay and Doppler frequency pairs and correlate the different local replicas with the digitized IF data representing the received RF navigational signal. Additionally, the code delay and Doppler frequency pair corresponding to the peak value can be used to initialize the tracking process.

Once the carrier frequency and the code phase alignments for a given satellite in view is determined by acquisition, the RF navigational signal from the satellite is tracked to accommodate changes in the carrier Doppler offset and/or code phase delay.

As shown in FIG. 2A, the navigational processor 32 processes the output data from each of the carrier and code phase acquisition and tracking channels 31a, 31b, . . . 31n. The navigational processor 32 can process data from the channels in a wide variety of ways, including, but not limited to, using closed form solutions and/or iterative processing. In one example, Kalman filtering is used at least in part to derive the navigational solution. For example, implementing the navigational processor 32 to provide Kalman filtering can aid is providing data fusion when the navigational processor 32 also processes sensor data from inertial sensors to enhance navigational accuracy.

The satellite navigation receiver 40 can be used in a wide variety of applications, including not only personal electronic navigational devices, but also in vehicles such as automobiles, aircraft, and/or ships.

Figure 2B:
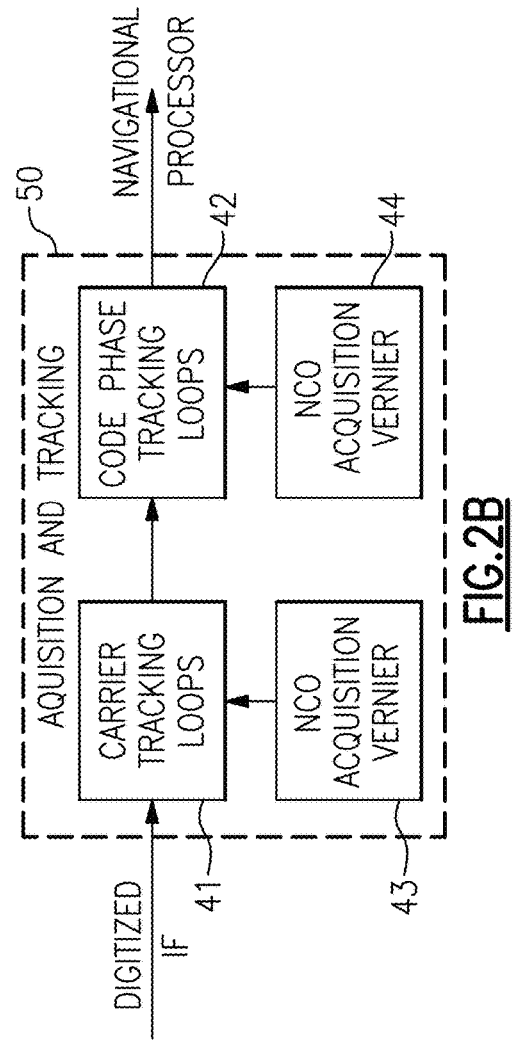
FIG. 2B is a schematic diagram of one embodiment of a carrier and code phase acquisition and tracking channel.

FIG. 2B is a schematic diagram of one embodiment of a carrier and code phase acquisition and tracking channel 50. The carrier and code phase acquisition and tracking channel 50 includes one or more carrier tracking loops 41, one or more code phase tracking loops 42, a carrier acquisition control circuit 43, and a code phase acquisition control circuit 44.

The carrier and code phase acquisition and tracking channel 50 serves to process digitized IF data representing an RF navigational signal received from a satellite. In response to initial reception of such an RF navigation signal, the carrier and code phase acquisition and tracking channel 50 operates to acquire both the carrier frequency (offset by a specific Doppler frequency) and the code phase, and to track changes in the acquired carrier and code phase as the satellite and/or user moves. The data outputted from the carrier and code phase acquisition and tracking channel 50 is used by a navigational processor (for instance, the navigational processor 32 of FIG. 2A) to recover navigational information, such as time of day, location, speed, and/or directional information.

Thus, the carrier and code phase acquisition and tracking channel 50 serves to provide navigational signal acquisition and tracking. In the illustrated embodiment, the carrier tracking loops 41 include frequency locked carrier loops that are adjusted by a numerically controlled oscillator (NCO) to achieve acquisition. In certain implementations, after carrier acquisition is achieved, the frequency locked carrier loops are transitioned to phase-locked loops (PLLs) with reduced bandwidth.

The code phase tracking loops 42 utilize the delayed code replicas to search the 1023 chips to acquire the signal. In certain implementations, the code phase acquisition control circuit 44 provides Vernier NCO adjustments to maintain correlation functions at peak level. After code phase acquisition, the replica code delays can be increased to provide increased resolution of the link dynamics by using Vernier offsets on replicas at each end of the delay spread.

Once the carrier frequency alignment and code phase alignment has been acquired, the received RF navigational signal is tracked to accommodate changes in code delay and/or carrier phase. For example, the illustrated control loops can include frequency locking loops, phase locking loops, Costas loops, and/or a combination thereof depending on link dynamics and/or application. When code phase tracking, the user replica code delays can be increased to span a greater time interval, with Vernier adjustment of delayed user replicas can be applied at the extreme ends of the expanded time delay to identify correlation function variations that indicate user/satellite range changes. Since range changes can vary multipath phasing and consequently correlation peak values, normalized correlation output levels can be used while tracking alignment to the peak correlation function level.

The output of the carrier and code phase acquisition and tracking channel 50 is provided to a navigational processor. When using N channels, the N outputs are provided to the navigational processor to recover navigational data, such as user position, velocity, direction, and/or time data.

Figure 3:
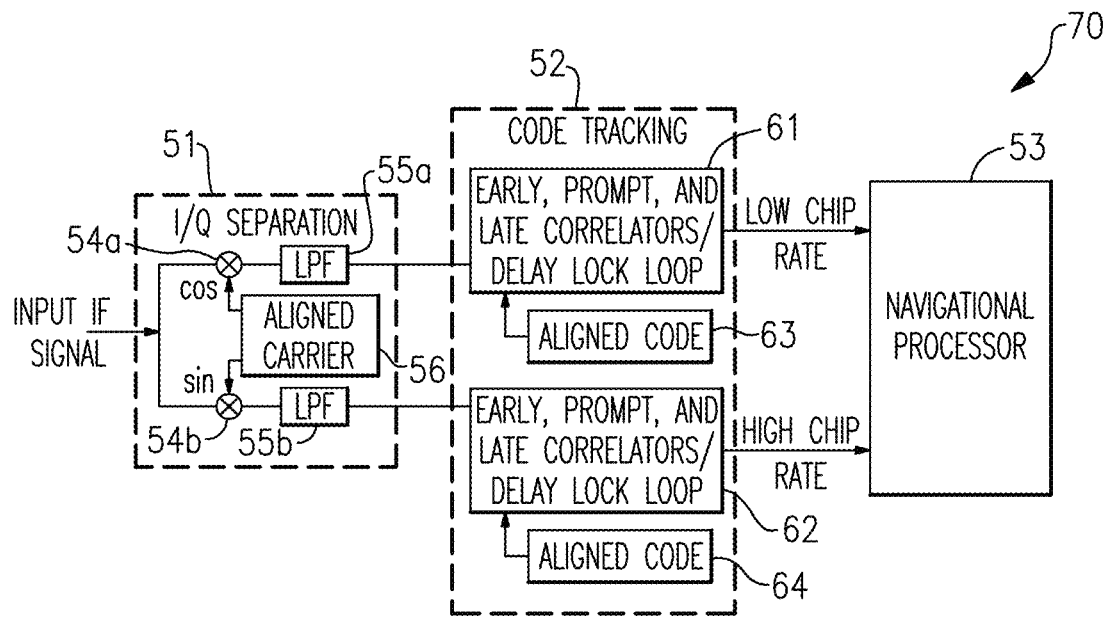
FIG. 3 is a schematic diagram of a prior art satellite navigation receiver.

FIG. 3 is a schematic diagram of a prior art satellite navigation receiver 70. The satellite navigation receiver 70 includes in-phase/quadrature-phase (I/Q) separation circuitry 51, code tracking circuitry 52, and a navigational processor 53.

As shown in FIG. 3, the I/Q separation circuitry 51 processes an input IF signal to generate an I signal and a Q signal that are provided to the code tracking circuitry 52. The I/Q separation circuitry 51 includes an I-path downconverter 54a, an I-path low pass filter (LPF) 55a, a Q-path downconverter 54b, a Q-path LPF 55b, and a carrier alignment circuit 56. The carrier alignment circuit 56 outputs a pair of quadrature clock signals (cos and sin, in this example) used by the I-path downconverter 54a and Q-path downconverter 54 for frequency downconversion and FQ separation.

The FQ separation circuitry 51 performs I/Q separation using the received carrier aligned with the Doppler shifted received code component. In certain implementations, the carrier alignment circuit 56 operates to compensate any Doppler frequency offsets and to track their variations.

With continuing reference to FIG. 3, the code tracking circuitry includes a first delay lock discriminator 61, a second delay lock discriminator 62, a first code alignment circuit 63, and a second code alignment circuit 64.

As shown in FIG. 3, the first delay lock discriminator 61 performs alignment on an I code component (associated with a low chip rate) while the second delay lock discriminator 62 performs alignment on a Q code component (associated with a high chip rate). The code alignment performed by the delay lock discriminators operate on early and late correlation functions. Additionally, the prompt correlation straddles the early and late correlation functions processed by the delay lock discriminators.

Thus, the satellite navigation receiver 70 includes a carrier tracking loop to perform carrier frequency alignment to compensate any Doppler frequency offsets and track their variation. Additionally, the satellite navigation receiver 70 further includes delay lock discriminators operating on early and late correlation functions to acquire code phase delays, and that form a closed loop discriminator to align the received satellite navigational code phase. The recovered low chip rate data and high chip rate data is provided to the navigational processor 53.

When multipath is not present, the receiver 70 can provide accurate measurement of the delay in the phase of the local replica code and the received code. However, multipath components can distort the correlation function of the discriminators, thereby reducing the accuracy with which navigational information (e.g., location, velocity and time) is determined. Moreover, the receiver 70 can suffer from long acquisition times.

Figure 4:
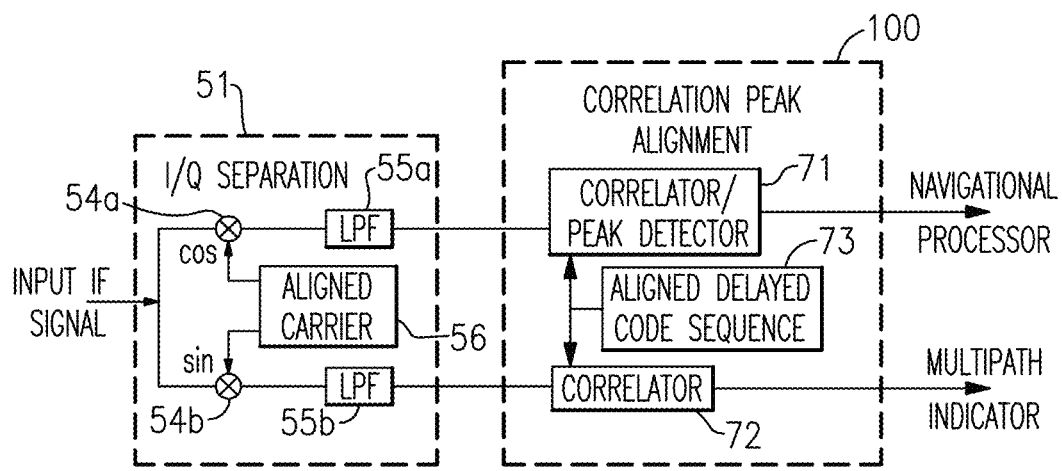
FIG. 4 is a schematic diagram of I/Q separation circuitry and correlation peak alignment circuitry according to one embodiment.

FIG. 4 is a schematic diagram of I/Q separation circuitry 51 and correlation peak alignment circuitry 100 according to one embodiment.

The I/Q separation circuitry 51 includes an I-path downconverter 54a, an I-path low pass filter (LPF) 55a, a Q-path downconverter 54b, a Q-path LPF 55b, and a carrier alignment circuit 56. The I/Q separation circuitry 51 separates a received signal (an input IF signal, in this example) into an I signal component and a Q signal component while aligning and maintaining carrier phase in the presence of changes in Doppler offsets. In certain implementations, the I signal component carriers a low chip rate code, while the Q signal component carries a high chip rate code.

The correlation peak alignment circuitry 100 includes a correlator/peak detector 71 for processing the I signal component, a correlator 72 for processing the Q signal component, and a code delay control circuit 73.

The correlation peak alignment circuitry 100 provides alignment in code phase by sweeping the delay of the user's undistorted replica code (for instance, incrementally in small steps) with the I signal component to measure the correlation function, with a peak value indicating alignment with the user's replica code. In certain implementations, the correlation peaking alignment circuitry 100 uses an NCO for sweeping the delay of the user's replica code.

Thus, rather than using a delay lock discriminator operating on early and late correlation functions, the correlation peak alignment circuitry 100 uses the correlator/peak detector 71 to measure the correlation function across a range or sweep in delay of the user's replica code controlled by the NCO or other suitable circuitry. Additionally, the amount of delay corresponding to the peak value of the correlation function indicates code phase alignment.

Accordingly, to perform code alignment, the correlation peak alignment circuitry 100 sweeps the delay of the replica code relative to the received signal while measuring the correlation function for each point in the sweep. In certain implementations, Vernier delay variations (for instance, using the code phase acquisition control circuit 44 of FIG. 2B) are performed to determine the peak correlation value.

By implementing a satellite navigation receiver in this manner, pseudorange deviations resulting from multipath components are mitigated.

This same methodology can be applied to the high chip rate codes transmitted in quadrature to the low chip rate code. The high chip rate codes provide greater resolution of the correlation peak delay and further opportunities for averaging. Thus, in certain implementations, a low chip rate code and a higher chip rate code can be acquired using correlators/peak detectors. Moreover, the low chip rate code phase alignment using Vernier adjustments and correlation peak detection can be further refined by applying the same code phase alignment technique to the high chip rate code.

In the illustrated embodiment, the correlation peak alignment circuitry 100 performs correlations on each of the I signal component and the Q signal component. For example, the I signal component represents the combination of the real part of the multipath components combined with the direct component. As discussed above, the I signal component is processed and correlated to establish code alignment.

The Q signal component represents the imaginary part of the multipath components, and can also be correlated with the aligned code multipath components. In practice, the multipath components are rarely completely in-phase or out-of-phase with the direct component and have finite imaginary signal levels. Thus, correlation of the imaginary part of the signal excludes the direct component and provides insight into multipath component delays and locations that can benefit GPS users. For example, such a correlation can generate a multipath indicator signal that can be used by a navigational processor and/or other circuitry to enhance navigational accuracy.

In certain implementations, multiple copies of the correlation peak alignment circuitry 100 are included in a satellite navigation receiver. For example, multiple instantiations of the correlation peak alignment circuitry 100 can used for processing multiple copies of the replica code offset in carrier frequency and code phase to thereby reduce acquisition time and provide averaging to reduce noise variance. By using additional code replicas and correlators, parallel rather than serial acquisition is achieved for reduced latency.

Furthermore, increased acquisition range is achieved by using additional correlators with digitally delayed user's replica codes. For example, the correlation functions can be spaced by a given number of chips to reduce multipath distortion interactions between correlations. Additionally, the user replica code collection can be digitally swept in delay (for instance, using an NCO), with the multiple delayed code replicas advantageously providing averaging to reduce noise variance.

Moreover, since the user receiver uses an open loop search for the correlation function peak value, additional correlation functions produced by delayed user replica codes and frequency offsets provides insight into the satellite tracking function, for instance, changes in the range from the satellite and a mechanism to maintain alignment with the peak value of the correlation function.

Figure 5A:
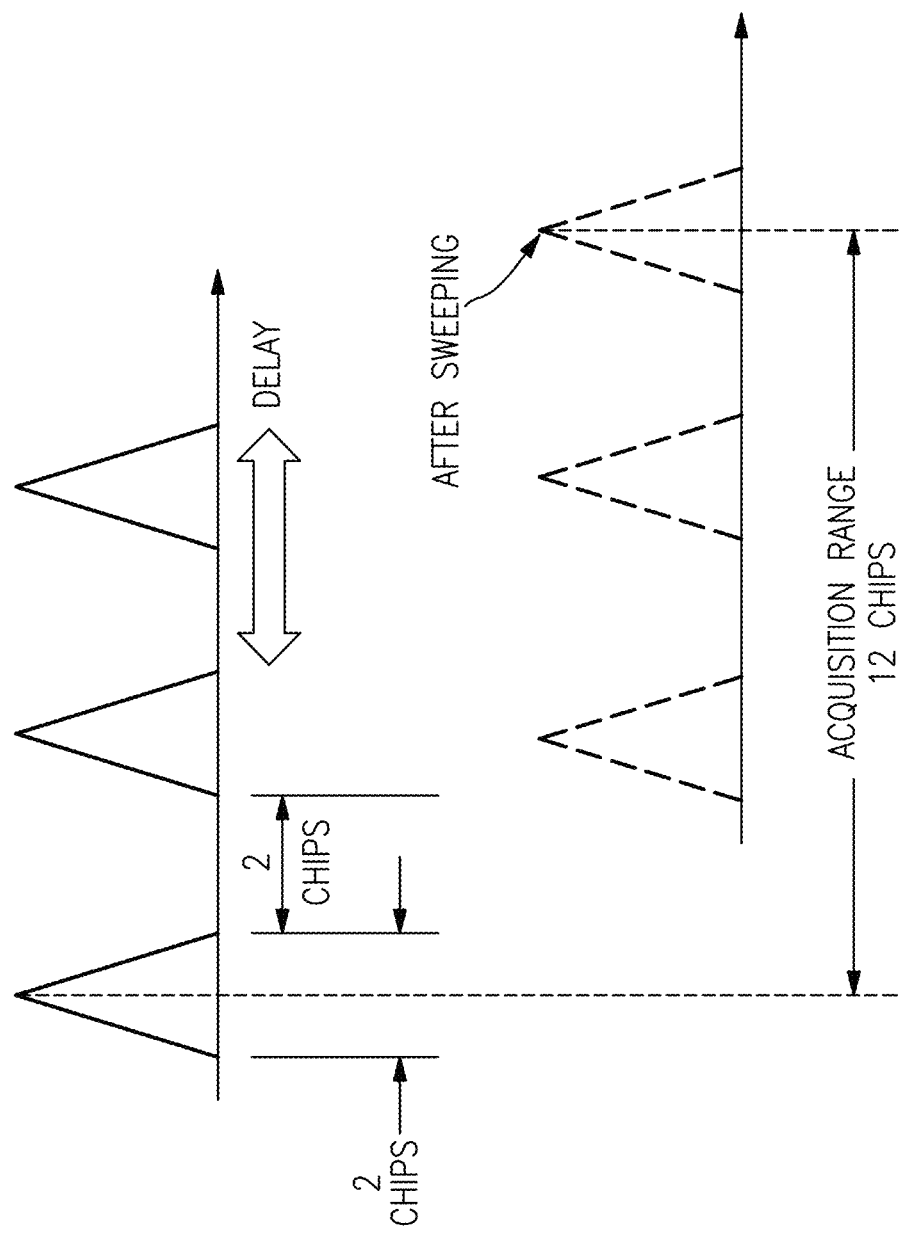
FIG. 5A is a graph of one example of multiple correlator operation to increase acquisition range.

FIG. 5A is a graph of one example of multiple correlator operation to increase acquisition range. In the illustrated example, correlation functions are spaced by 4 chips to minimize the multipath distortion interactions between correlations. The example of three correlators in FIG. 5A covers a delay range of 12 chips after a sweep of 4 chips.

In contrast, when the satellite navigation receiver 70 of FIG. 3 steps the user's replica code in ½ chip increments during acquisition, 24 chip samples would be required compared to sweeping 4 chip delays as in the example of FIG. 5A.

Using multiple correlators provides a number of advantages, including reduced acquisition time and providing averaging to reduce noise variance. Thus, by using additional code replicas and correlations, parallel rather than serial acquisition is achieved for reduced latency. Further, since the closed loop early/late discriminator is replaced with an open loop search for the correlation function peak value, additional correlation functions distributed in time delays and frequencies provides insight into changes in the range from the satellite and a mechanism to maintain alignment with the correlation function peak values (the tracking function).

Thus, additional correlators are used to achieve parallel rather than serial processing, thereby extending the acquisition range and reducing acquisition time. Additional correlations using offset Doppler values further reduce the acquisition time.

FIG. 5B is a graph of one example of a two-dimensional carrier and code phase search. The example two-dimension search using multiple correlators uses digital analysis techniques to implement 9 search cells, 3 for the code phase search at 3 different Doppler offsets for the carrier search, to examine all possible 1023 cell positions.

In certain implementations, a two-dimensional process is used to align both carrier frequency and the code phase, including a first dimension for a code phase search and a second dimension for a carrier search. For example, the first dimension can represent code phase in chips or fractions of chips while the second dimension can represent carrier frequency in Doppler frequency bins.

Such a two-dimensional alignment process can further utilize prior satellite locations, an almanac of satellite positions, rough knowledge of the user's own position, and/or estimated GPS time. Moreover, mobile platforms (for instance, cellular devices, such as smart phones) can use inertial sensors that provide mutual benefits between the GNSS receiver and inertial sensor. For instance, such information can provide a starting point to search for the Doppler offset for a specific satellite.

The acquisition process continues until the Doppler shifted carrier frequency is located and the code phase is determined as indicated by peak correlation levels. Smaller Vernier offsets can be used to identify the correlation peak values. Once the carrier frequency alignment and code phase alignment for a given satellite has been determined in the acquisition process, the received signal is tracked to accommodate changes in code delay and/or carrier phase.

Figure 6:
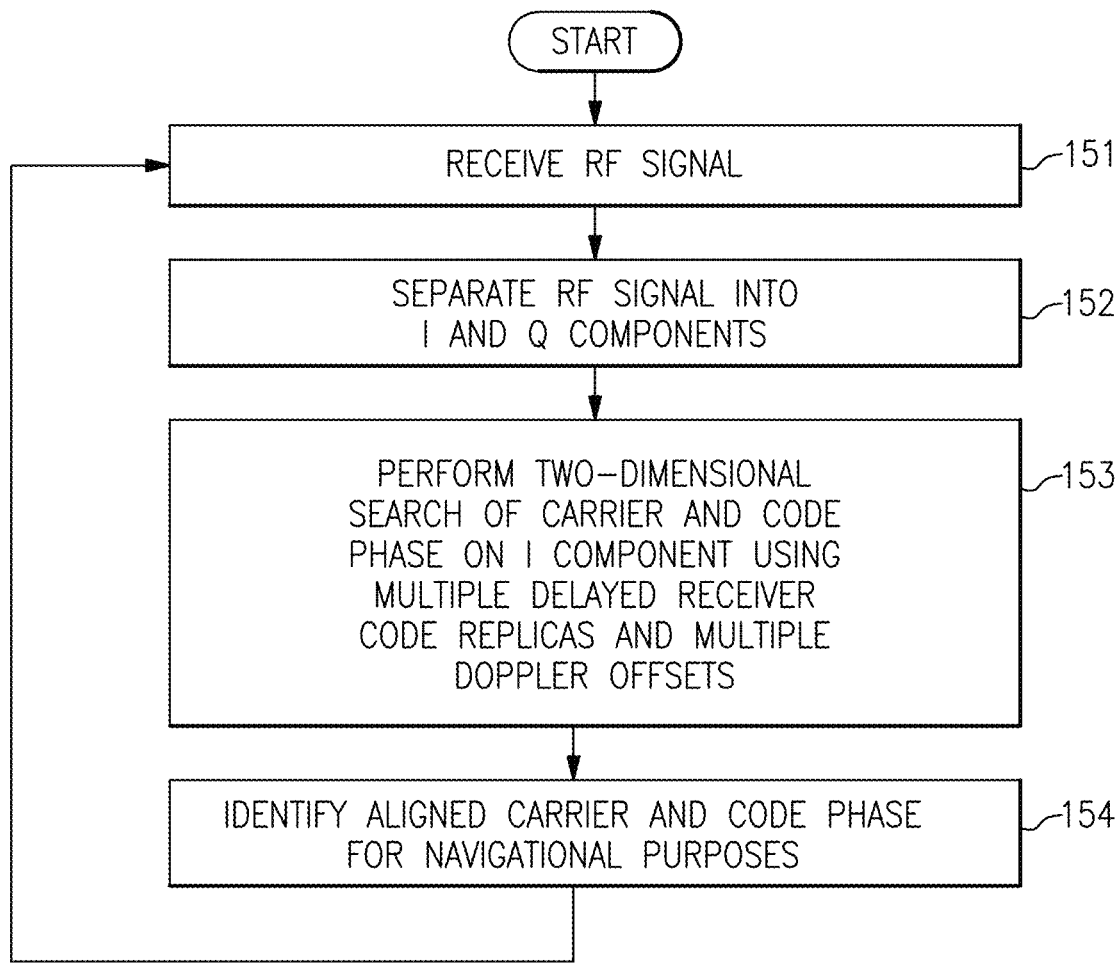
FIG. 6 is a flow chart of one embodiment of a method of performing carrier and code phase alignment in a satellite navigation receiver.

FIG. 6 is a flow chart of one embodiment of a method of performing carrier and code phase alignment. The method can be performed by a satellite navigation receiver implemented in accordance with the teachings herein.

The method begins at a step 151, in which an RF signal is received by the satellite navigational receiver. For example, the satellite navigational receiver can include an RF front end (for instance, the front end components 30 of FIG. 2A) for receiving the RF signal.

With continuing reference to FIG. 6, the method continues to a step 152 in which the RF signal is separated into I and Q components. Such a separation can be performed by FQ separation circuitry (for instance, the I/Q separation circuitry 51 of FIG. 4) after the RF signal has been processed to generate an IF input signal.

The method continues to a step 153, in which a two-dimensional search of carrier and code phase is performed on the I component using multiple delayed receiver code replicas and multiple Doppler offsets in parallel. For example, carrier and code phase acquisition and tracking channels (for instance, the channels 31a, 31b, . . . 31n of FIG. 2A) can be implemented to do such as two-dimensional search in parallel (for instance, the two-dimensional search of FIG. 5B).

The method continues to step 154, in which the aligned carrier and code phase for navigational purposes is identified from the search. Thus, the acquisition process continues until the Doppler shifted carrier frequency is located and the code phase is determined as indicated by peak correlation levels.

References throughout this specification to "one embodiment," "an embodiment," "a related embodiment," or similar language mean that a particular feature, structure, or characteristic described in connection with the referred to "embodiment" is included in at least one embodiment of the present invention. Thus, appearances of the phrases "in one embodiment," "in an embodiment," and similar language throughout this specification may, but do not necessarily, all refer to the same embodiment. It is to be understood that no portion of disclosure, taken on its own and in possible connection with a figure, is intended to provide a complete description of all features of the invention.

In the drawings like numbers are used to represent the same or similar elements wherever possible. The depicted structural elements are generally not to scale, and certain components are enlarged relative to the other components for purposes of emphasis and understanding. It is to be understood that no single drawing is intended to support a complete description of all features of the invention. In other words, a given drawing is generally descriptive of only some, and generally not all, features of the invention. A given drawing and an associated portion of the disclosure containing a description referencing such drawing do not, generally, contain all elements of a particular view or all features that can be presented is this view, for purposes of simplifying the given drawing and discussion, and to direct the discussion to particular elements that are featured in this drawing. A skilled artisan will recognize that the invention may possibly be practiced without one or more of the specific features, elements, components, structures, details, or characteristics, or with the use of other methods, components, materials, and so forth. Therefore, although a particular detail of an embodiment of the invention may not be necessarily shown in each and every drawing describing such embodiment, the presence of this detail in the drawing may be implied unless the context of the description requires otherwise. In other instances, well known structures, details, materials, or operations may be not shown in a given drawing or described in detail to avoid obscuring aspects of an embodiment of the invention that are being discussed. Furthermore, the described single features, structures, or characteristics of the invention may be combined in any suitable manner in one or more further embodiments.

Moreover, if the schematic flow chart diagram is included, it is generally set forth as a logical flow-chart diagram. As such, the depicted order and labeled steps of the logical flow are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow-chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Without loss of generality, the order in which processing steps or particular methods occur may or may not strictly adhere to the order of the corresponding steps shown.

The features recited in claims appended to this disclosure are intended to be assessed in light of the disclosure as a whole.

At least some elements of a device of the invention can be controlled—and at least some steps of a method of the invention can be effectuated, in operation—with a programmable processor governed by instructions stored in a memory. The memory may be random access memory (RAM), read-only memory (ROM), flash memory or any other memory, or combination thereof, suitable for storing control software or other instructions and data. Those skilled in the art should also readily appreciate that instructions or programs defining the functions of the present invention may be delivered to a processor in many forms, including, but not limited to, information permanently stored on non-writable storage media (e.g. read-only memory devices within a computer, such as ROM, or devices readable by a computer I/O attachment, such as CD-ROM or DVD disks), information alterably stored on writable storage media (e.g. floppy disks, removable flash memory and hard drives) or information conveyed to a computer through communication media, including wired or wireless computer networks. In addition, while the invention may be embodied in software, the functions necessary to implement the invention may optionally or alternatively be embodied in part or in whole using firmware and/or hardware components, such as combinatorial logic, Application Specific Integrated Circuits (ASICs), Field-Programmable Gate Arrays (FPGAs) or other hardware or some combination of hardware, software and/or firmware components.

As used herein, a phrase referring to "at least one of" a list of items refers to any combination of those items, including single members. As an example, "at least one of: a, b, or c" is intended to cover: a, b, c, a-b, a-c, b-c, and a-b-c.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a sub combination or variation of a subcombination.

What is claimed is:

1. A satellite navigation receiver comprising:
   a radio frequency (RF) front end system configured to receive an RF navigational signal from a satellite and to output digital data representing a navigational code transmitted by the satellite; and
   at least one carrier and code phase acquisition and tracking channel configured to process the navigational code, wherein the at least one carrier and code phase acquisition and tracking channel comprises:
   a carrier acquisition circuit configured to compensate the navigational code for a Doppler frequency offset; and
   a code phase acquisition circuit configured to generate a replica code corresponding to the navigational code, to perform a correlation of the replica code and the navigational code while sweeping the replica code in delay, and to identify a delay corresponding to a peak correlation value of the replica code and the navigational code.

2. The satellite navigation receiver of claim 1, wherein the code phase acquisition circuit comprises a plurality of correlators operating in parallel to perform correlations on a plurality of copies of the replica code having different time offsets.

3. The satellite navigation receiver of claim 2, wherein the plurality of correlators are configured to output a plurality of peak correlation delay values, wherein the satellite navigation receiver further comprises a navigational processor configured to average the plurality of peak correlation delay values to reduce noise variance.

4. The satellite navigation receiver of claim 2, wherein at least a portion of the plurality of copies of the replica code have different Doppler frequency offsets.

5. The satellite navigation receiver of claim 1, wherein the at least one carrier and code phase acquisition and tracking channel comprise a plurality of carrier and code phase acquisition and tracking channel configured to perform a two-dimensional open loop search of carrier Doppler offset and code phase delay.

6. The satellite navigation receiver of claim 1 further comprising a navigational processing unit configured to process data from the at least one carrier and code phase acquisition and tracking channel to recover navigational data, wherein the navigational data includes at least one of a time of day, a location, a speed, or directional information.

7. The satellite navigation receiver of claim 1, wherein the at least one carrier and code phase acquisition and tracking channel comprises four or more carrier and code phase acquisition and tracking channels configured to process navigational codes from at least four satellites.

8. The satellite navigation receiver of claim 1, wherein the carrier acquisition circuit is configured to receive the digital data from the RF front end system and to output an in-phase (I) signal and quadrature-phase (Q) signal, wherein the I phase signal includes the navigational code.

9. The satellite navigation receiver of claim 8, wherein the code phase acquisition circuit is further configured to correlate the replica code and the Q signal to generate a multipath indicator signal.

10. The satellite navigation receiver of claim 1, wherein the code phase acquisition circuit further comprises a numerically controlled oscillator (NCO) configured to sweep the replica code in delay.

11. The satellite navigation receiver of claim 1, wherein the at least one carrier and code phase acquisition and tracking channel does not include any early/late discriminators.

12. A method of navigational signal processing in a satellite navigation receiver, the method comprising:
    processing a radio frequency (RF) navigation signal using an RF front end system, including outputting digital data representing a navigational code transmitted by a satellite;
    compensating the navigational code for a Doppler frequency offset using a carrier acquisition circuit;

generating a replica code corresponding to the navigational code using a code acquisition circuit;

correlating the replica code and the navigational code while sweeping the replica code in delay using the code acquisition circuit; and identifying a delay corresponding to a peak correlation value of the replica code and the navigational code using the code acquisition circuit.

13. The method of claim 11, wherein correlating the replica code and the navigational code further comprises using a plurality of correlators to perform parallel correlations on a plurality of copies of the replica code having different time offsets.

14. The method of claim 13, further comprising averaging a plurality of peak correlation delay values from the plurality of correlators to reduce noise variance.

15. The method of claim 13, wherein at least a portion of the plurality of copies of the replica code have different Doppler frequency offsets.

16. The method of claim 11, further comprising performing a two-dimensional open loop search of carrier Doppler offset and code phase delay.

17. The method of claim 11, further comprising processing output data from the code acquisition circuit to recover navigational data using a navigational processor, wherein the navigational data includes at least one of a time of day, a location, a speed, or directional information.

18. The method of claim 11, further comprising separating the digital data from the RF front end system into an in-phase (I) signal and quadrature-phase (Q) signal, wherein the I phase signal includes the navigational code.

19. The method of claim 18, further comprising correlating the replica code and the Q signal to generate a multipath indicator signal.

* * * * *